United States Patent [19]

Diner

[11] Patent Number: 4,819,064
[45] Date of Patent: Apr. 4, 1989

[54] TELEVISION MONITOR FIELD SHIFTER AND AN OPTO-ELECTRONIC METHOD FOR OBTAINING A STEREO IMAGE OF OPTIMAL DEPTH RESOLUTION AND REDUCED DEPTH DISTORTION ON A SINGLE SCREEN

[75] Inventor: Daniel B. Diner, Altadena, Calif.

[73] Assignee: The United States of America as represented by the Administrator of the National Aeronautics and Space Administration, Washington, D.C.

[21] Appl. No.: 125,666

[22] Filed: Nov. 25, 1987

[51] Int. Cl.[4] .............................................. H04N 13/00
[52] U.S. Cl. ........................................ 358/88; 358/91; 358/92
[58] Field of Search ....................... 358/88, 89, 91, 92; 364/522

[56] References Cited

U.S. PATENT DOCUMENTS

| | | |
|---|---|---|
| 3,598,032 | 8/1971 | Bohn et al. |
| 3,959,580 | 5/1976 | Chocol et al. |
| 4,399,456 | 8/1983 | Zalm ...................................... 358/92 |
| 4,558,359 | 12/1985 | Kuperman ............................. 358/89 |
| 4,647,965 | 3/1987 | Imsand ................................... 358/88 |
| 4,671,632 | 6/1987 | August ............................. 358/88 X |
| 4,677,468 | 6/1987 | Morishita .............................. 358/88 |
| 4,704,627 | 11/1987 | Yuyama et al. ....................... 358/88 |
| 4,723,159 | 2/1988 | Imsand ................................... 358/88 |

FOREIGN PATENT DOCUMENTS 0145291  8/1983  Japan ...................................... 358/88

Primary Examiner—James J. Groody
Assistant Examiner—Victor R. Kostak
Attorney, Agent, or Firm—Thomas H. Jones; John R. Manning; Paul F. McCaul

[57] ABSTRACT

A method and apparatus for obtaining a stereo image with reduced depth distortion and optimum depth resolution. Static and dynamic depth distortion and depth resolution trade-off is provided. Cameras obtaining the images for a stereo view are converged at a convergence point behind the object to be presented in the image, and (a) the collection-surface-to-object distance, (b) the camera separation distance, and (c) the focal lengths of zoom lenses for the cameras are all increased. Doubling the distances cuts the static depth distortion in half while maintaining image size and depth resolution. Dynamic depth distortion is minimized by panning a stereo view-collecting camera system about a circle which passes through the convergence point and the cameras' first nodal points. Horizontal field shifting of the television fields on a television monitor brings both the monitor and the stereo views within the viewer's limit of binocular fusion.

32 Claims, 7 Drawing Sheets

THE GEOMETRY OF CONVERGED STEREO CAMERAS. ON THE LINES OF EQUIDISTANT PROJECTION, EVERY PIXEL SEES A UNIT LENGTH SEGMENT OF (L/f) * (WIDTH/PIXEL AT CCD). THE No. PIXELS DIFFERENCE PRESENTED TO THE MONITOR BY THE TWO CAMERAS WILL BE PROPORTIONAL TO (Pl' - Pr').

THE GEOMETRY OF CONVERGED STEREO CAMERAS. ON THE LINES OF EQUIDISTANT PROJECTION, EVERY PIXEL SEES A UNIT LENGTH SEGMENT OF (L/f) * (WIDTH/PIXEL AT CCD). THE No. PIXELS DIFFERENCE PRESENTED TO THE MONITOR BY THE TWO CAMERAS WILL BE PROPORTIONAL TO (Pl' - Pr').

DEPTH DISTORTION BETWEEN 2 BARS AS STEREO CAMERA PAIR IS TRANSLATED TO THE RIGHT. THE LEFT BAR MUST BE MOVED DISTANCE dL − dR TO BE EQUIDISTANT, BEHIND THE VIETH − MUELLER CIRCLE, WITH THE RIGHT BAR. THOSE POINTS ON THE VIETH − MUELLER CIRCLE WHICH ARE VISABLE TO THE CAMERAS PRESENT 0 PIXELS DIFFERENCE TO THE MONITOR SCREEN.

MINIMIZATION OF DYNAMIC DEPTH DISTORTION

POINT B REPRESENTS THE PREFERRED CENTER OF ROTATION, i.e., THE CENTER OF THE VIETH-MUELLER CIRCLE. PANNING THE CAMERA PAIR ABOUT THIS POINT WILL MINIMIZE DYNAMIC DISTORTION (NOTE: dL = dR)

PARTIAL MINIMIZATION OF DYNAMIC DEPTH DISTORTION. (NOTE: dL − dR IS SMALLER THAN IN FIGURE 4)

MINIMIZATION OF STATIC DEPTH DISTORTION. BY DOUBLING THE CAMERA-TO-OBJECT VIEWING DISTANCE, THE INTERCAMERA DISTANCE AND THE FOCAL LENGTH OF THE CAMERA LENSES, ONE CAN MAINTAIN IMAGE FIELD SIZE AND STEREO DEPTH RESOLUTION, WHILE CUTTING THE STATIC STEREO DEPTH DISTORTION IN HALF.

TELEVISION MONITOR FIELD SHIFTER AND AN OPTO-ELECTRONIC METHOD FOR OBTAINING A STEREO IMAGE OF OPTIMAL DEPTH RESOLUTION AND REDUCED DEPTH DISTORTION ON A SINGLE SCREEN

ORIGIN OF THE INVENTION

The invention described herein was made in the performance of work under a NASA contract and is subject to the provisions of Public Law 96-517 (35 USC 202) in which the Contractor has elected not to retain title.

BACKGROUND OF THE INVENTION

1. Field of the Invention

The present invention is directed to a television monitor field shifter used in conjunction with two images, collected from different viewpoints and transmitted, for stereoscopic reproduction, to a single monitor. More specifically, the present invention is directed to a method of providing a stereo image of optimal depth resolution and reduced depth distortion on a single screen with regard to a selected region of interest that lies within the field of view of the image-obtaining system.

2. Brief Description of the Prior Art

It is known in the prior art to display on a single screen a "composite" image taken by a pair of video or like television cameras for the purpose of creating a stereo image. The "composite" image displayed on the video screen is created by alternately displaying the respective images taken by a left and then a right camera of a camera pair. In accordance with the past state of the art, a monitor first presents all of the odd lines of a TV image upon the screen and next presents all of the even lines. All of the odd and even lines collectively are called odd and even fields respectively. In accordance with a national standard, (NTSC Standard Television) this process is repeated thirty (30) times per second. Still in accordance with the prior art, this standard form of picture presentation is modified for three dimensional or "stereo" presentation of images on a single screen, by transmitting directly from the left camera, an image to be displayed on the screen by, e.g. the odd numbered lines, and thereafter projecting from the right camera an image to be displayed by the even numbered lines. A complete scan of the screen with odd and even fields is called a "frame" and the process of alternately displaying left and right images within a single frame is called "interlacing".

For "stereo" viewing of the interlaced left and right images a human observer must view the left image with his left eye and the right image with his right eye. One method of accomplishing this is by viewing the screen through a state-of-the-art liquid crystal stereo viewer which opens and closes light shutters in front of the eyes. The operation of the shutters in the stereo viewer is synchronized with the image being presented on the monitor so that the left eye sees the screen when the odd lines are displayed and the right eye sees the screen when the even lines are displayed.

The foregoing is accomplished in the prior art in connection with a substantially standard (cathode ray tube or the like) video screen for displaying the images taken by the left and right cameras. The left and rights fields, representative of image information, from the left and right cameras are applied to a switching box, which box interlaces the two fields to form each frame on the monitor.

Remote monitoring and control of objects, such as remote manipulation and control of equipment and robots has developed a need for an improved stereo control system. It will be readily appreciated by those skilled in the art that accurate stereo viewing of a remote site is especially important for remote manipulation of robots. Such applications may be required, for example, while working in outer space, underwater, or in nuclear facilities, to list some typical tasks.

A search of the prior art has developed several patents of interest to the application.

U.S. Pat. No. 4,647,965 to Imsand discloses a method for improving the viewing comfort of three dimensional images, including the shifting of images of objects, so that the object images on the screen are within the viewer's limit of binocular fusion. As a result of the shifting, the viewer does not see double images. Although the system of this patent is acceptable for entertainment purposes, it is not of significant value for remote control purposes, and one following the Imsand disclosure will create depth errors by visually changing an object's perceived depth.

U.S. Pat. No. 4,399,456 to Zalm suggests a device for shifting the left image in a three dimensional television display so that the viewer does not see scene information from the side edges of the screen. It is questionable whether any image shifting actually occurs, but assuming that there is image shifting, such shifting is restricted in that the left image can only be shifted to the right, and the right image can not be shifted at all. The extent of the shifting is no more than approximately six percent (6%) of the picture width.

U.S. Pat. No. 4,677,468 to Moroshita discloses a system wherein the images of two TV monitors are projected with optical lenses upon a single non-electric viewing screen. A device shifts the timing of the readout of the left eye frame memory and of the right eye frame memory with respect to each other, for the purpose of allowing the viewer to select an observation point different from that of the camera. Frames and not fields are shifted by Moroshita and there is not mention of the problem nor solution for depth distortion in this reference. Moreover, applicant's invention is directed to a TV monitor screen field shifter used to horizontally shift all possible combinational directions of two fields to be interlaced on the TV monitor screen. Moroshita does not teach or suggest applicant's invention.

For still further background to the present invention, reference is made to U.S. Pat. Nos. 3,959,580 and 3,598,032 (Chocol et al and Bohn et al).

In performing and reporting on the experiments that led to the development of this invention, the inventor has reported on some of the approaches discussed in the literature relative to stereo imaging. The report of the experimentation of which the inventor is the primary author, is entitled "Stereo Depth Distortions in Teleoperation." By Daniel B. Diner and Marika von Sydow, dated Feb. 1, 1987 JPL publication 87-1. That report ("Diner Report") is incorporated herein by reference.

As discussed in the Diner Report, camera configurations which are similar to natural human viewing conditions are called orthostereoscopic; unnaturally wide camera separation configurations are called hyperstereoscopic. In the literature on stereo imaging, some researchers advocate orthostereoscopic camera alignments, and other researchers advocate hyperstereoscopic camera alignment.

Shields, Kirkpatrick, Malone and Huggins, "Desing Parameters for a Stereoptic Television System Based on Direct Depth Perception Cues," Washington, D.C.: *Proceedings of the Human Factors Society 19th Annual Meeting,* (1975), pp. 423–427, found no gain in performance with hyperstereopsis on a stereo depth comparison task, and recommended orthostereopsis. This recommendation is not surprising as the depth distortion of hyperstereopsis may well have overridden the advantage of the increased depth resolution.

Grant, Meirick Polhemus, Spencer, Swain, and Tewell, "Conceptual Design Study for a Teleoperator Visual System Report," Denver, Co: *Martin Marietta Corporation Report NASA CR*-124273, (April 1973), found no gain in performance with hyperstereopsis on a peg-in-hole task and recommended orthostereopsis. A peg-in-hole task requires high depth percision only in a small region of the work space. The depth distortion of hyperstereopsis only becomes significant for objects which are separated horizontally. Thus the performance of the insertion of the peg into the hole should increase with the increased depth resolution of hyperstereopsis. Perhaps the depth distortions hurt the performance of the long range motions (such as moving towards the peg and moving the peg towards the hole) enough to overshadow the increase in performance of the insertions.

Upton and Strother, "Design and Flight Evaluation of a Helmet-mounted Display and Control System," In Birt, J. A. & Task, H. L. (Eds.), *A symposium on visually coupled systems: Development and application (AMD-TR-73-1),* Brooks Air Force Base, TX, (September, 1973), reported that hyperstereopsis greatly enhanced depth detection of camouflaged buildings from helicopter-mounted stereo camera. This result is expected. The critical point to be noted is that the accurate detection of depth is a different phenomenon from the accurate estimate of the magnitude of a true depth. Hyperstereopsis artificially magnifies the perceived magnitude of a true depth difference, making that depth difference easier to detect, but much harder to perform accurate teleoperation upon. For example, hyperstereopsis might make a one-story camouflaged building appear to be four stories tall.

Zamarian, "Use of Stereopsis in Electronic Displays: Part II—Stereoscopic Threshold Performance as a Function of System Characteristics," *Douglas Aircraft Company Report MDC J7410,* (December, 1976), reported that hyperstereopsis improved performance over orthostereopsis on a three-bar depth adjustment ask, using converged cameras. The three-bar depth adjustment task insures that the depth distortions will play a role in his experiment. He states, ". . . it was found that performance improved with increasing [camera] separation but at a decreasing rate of improvement." It is suspected that he was experiencing a trade-off between increased resolution and distortion.

Pepper, Cole, and Spain, "The Influence of Camera Separation and Head Movement on Perceptual Performance Under Direct and TV-displayed Condition," *Proceedings of the Society for Information Display,* 24, (1983), pp. 73–80, reported that hyperstereopsis improved performance on a two-bar depth adjustment task. They used parallel camera configurations, and therefore introduced no stereo depth distortions. Such results, therefore, do not compare directly to the invention presented in this application, nor do the results teach or suggest the invention.

Spain, "A Psychophysical Investigation of the Perception of Depth with Stereoscopic Television Displays," *University of Hawaii doctoral dissertation,* (May 1984), reported that hyperstereopsis improved performance on a two-bar depth adjustment task. He converged the cameras so that the camera convergence point was half-way between the two bars when the bars were located at equal depth. It is felt that each bar experience the same depth distortion. The net effect then would have been that the relative distortion between the two bars cancelled out. In that case, the increased stereo depth resolution of hyperstereopsis would have improved performance.

Bejczy, "Performance Evaluation of Computer-aided Manipulator Control." *IEEE International Conference on Systems, Man and Cybernetics,* (1976), reported surprisingly poor performance with a stereo TV viewing system of a task which required the positioning and orienting of an end-effector in an almost static visual scene. Operators were required to pick up one block and place it upon another block. Although the thrust of this work was to evaluate the effect of short-range proximity sensors in conjunction with mono and stereo camera systems on the performance of this task, the surprisingly poor performance with stereo viewing must be noted.

In reviewing the literature, it was noticed that most analyses of stereo TV viewing use small angle approximations. However, I have discovered that the actual stereo distortion of the fronto-parallel plane of convergence is such that small angle approximations obscure the relationship between this distortion and the key parameters of the camera configurations.

The above-noted prior art patents that disclose stereo systems for entertainment are aimed primarily at viewer comfort and are not useful for the critical tasks of teleoperation. The literature discussed above and the known patents applicable to teleoperation (Morishita) do not appear to have perceived that the visual depth distortion and depth resolution varies within the field of view of the cameras. Additionally the use of small angle approximations by the prior art study approaches has obscured valuable parameters concerning depth distortion and depth resolution. This invention discloses and claims horizontal field shifting for a TV monitor image and a stereo image presentation technique on a standard TV monitor which increases depth resolution while decreasing depth distortion, thus solving the resolution/distortion trade-off.

SUMMARY OF THE INVENTION

It is an object of the present invention to provide a method whereby operators who are interested in high-precision depth views of remote locations, perhaps to control robots, machinery or perform like tasks, with the assistance of video views gained by converged remote viewpoints, can perform high precision depth tasks and/or judgments with minimal interference due to stereo depth distortion.

It is another object of the present invention to provide in a remote monitoring system using two video viewpoints and a single video display, a method for obtaining, with regard to an accurate region of interest in the stereoscopically viewed space, optimal depth resolution with relatively minimal depth distortion.

The foregoing and other objects and advantages are attained by a method which in a remote viewing system utilizes a right video viewpoint and a left video viewpoint having respective fields of view which overlap in part with both views being transmitted to a single video display screen. Method and apparatus horizontally shift the odd and even fields, representing the views, for interlacing in shifted form on a single monitor screen for stereoscopic viewing.

In accordance with the method of the invention, a region of interest is selected in the stereoscopically viewed space, the region being one wherein optimal stereo viewing, and therefore maximal stereo depth resolution and minimal stereo depth distortion are desired. The video viewpoints act as image collection locations which have central axes that are purposely converged behind the region of primary interest to an operator viewing the monitor screen. (Parallel cameras are understood to converge at infinity and thus are included in the above-mentioned camera configuration.) Data representative of the images obtained by the left and right viewpoints are transmitted for application to a single video TV monitor screen. One field each of the images of the left and right viewpoints are alternatively displaced and interlaced in a known manner for stereo viewing on the monitor. The views of the screen by the left eye and right eye of an observer are blocked alternatively and synchronously with the projection of the left and right viewpoint field images so that the viewer sees the left viewpoint's image only with his left eye, an the right viewpoint's image only with his right eye. The images of the left and right viewpoints are electronically shifted (left image to the left, right image to the right) on the video screen such that the TV monitor screen and the two images presented thereon are within the viewer's limit of binocular fusion. Consequently, optimal stereo resolution and minimal stereo depth distortion is attainable on a standard TV monitor screen with regard to objects at or in front of the selected region.

In accordance with the invention, a human observer, such as an operator of remotely controlled equipment, is able to utilize the remote viewing system to direct and follow the performance of tasks with optimal stere depth resolution and low stereo depth distortion.

The features of the present invention can be best understood together with further objects and advantages by reference to the following description, taken in connection with the accompanying drawings.

DESCRIPTION OF THE PREFERRED EMBODIMENT

The embodiment of the invention disclosed herein is the best mode contemplated by the inventor for carrying out his invention, although it should be understood that various modifications can be accomplished within the parameters of the present invention.

Figure 1:
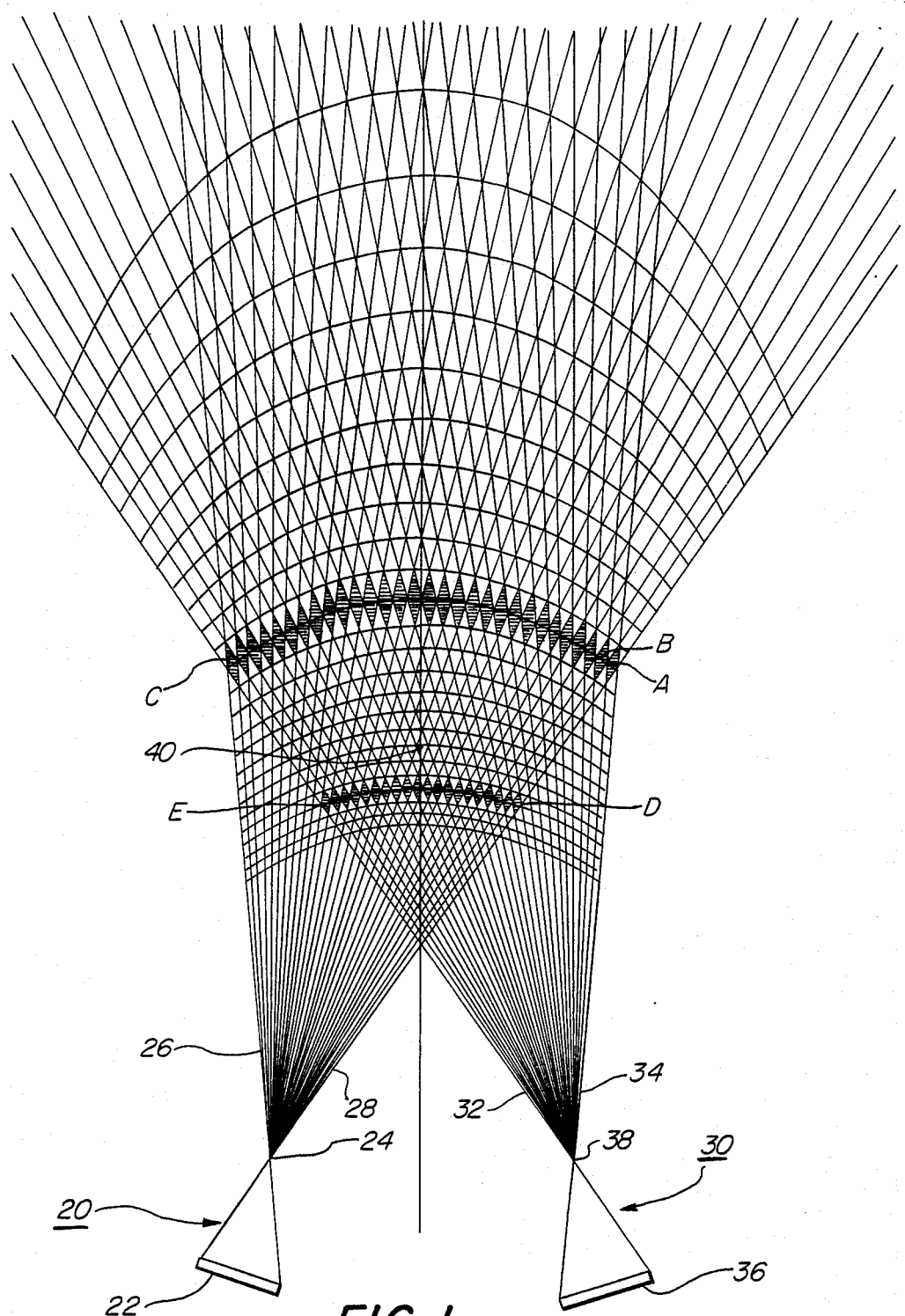
FIG. 1 is a schematic representation of the field of view of converged stereo viewpoints.

Referring now to the drawings and particularly to FIG. 1, the fields of view of two converged television monitoring cameras are shown schematically. At this point it should be understood that the two cameras may be replaced by any suitable combination of image collection devices. The description of two cameras is for ease of understanding only, since the invention in its broadest concept involves merely a source of image collection view surfaces which are displayed as video images. The cameras have variable focus such as is provided by a zoom lens. For simplicity purposed, the term "cameras" will be described and used herein, rather continually referring to the more cumbersome term "image collection view surfaces".

More specifically, in its stationary position indicated on FIG. 1, a left television or video camera 20 views a region of space, which is defined by the straight lines originating from the edges of the camera's image collection plate 22, and which intersect approximately in the optical center 24 (first nodal point based upon a pin-hole approximation) of the camera's lends. In the schematic view of FIG. 1 the lens is not shown specifically whereas the lines defining he camera's view bear the reference numerals 26 and 18. Similarly, the view of a right camera 20 is defined by lines 32 and 34 which originate from the right camera's image plate 36 and intersect approximately at the optical center 38 (first nodal point based upon a pin-hole approximation) of the camera's lens (not shown). Zoom lenses along the image-collection axes are understood throughout the description, as will become more evident hereinafter.

The area wherein three-dimensional viewing of objects is possible (with the depicted stationary position of both cameras) is the crosshatched area 40 within the field of view of both left and right cameras 20 and 30. On the schematic view of FIG. 1, this area 40, bounded on the left first by line 32 then by line 26, and on the right by line 28 then by line 34, is filled with diamonds. Each diamond represents the intersection of the regions of space viewed by two picture elements (pixels) one from each camera.

With this basic approach of FIG. 1 established, the demands of orthostereoscopic teleoperation may be discussed in more detail. In teleoperation, one typical application of stereo vision is the viewing of a work space located 1 to 3 meters away from the cameras and in region 40. The trade-off between stereo depth resolution and stereo depth distortion as a function of camera configuration, is now discussed.

When selecting a stereo camera configuration, it is necessary to choose between parallel and converged camera configurations. Parallel configurations, which may have certain advantages for far stereo viewing, have inherent undesirable aspects for near stereo viewing. First of all, for near locations, the two views of parallel cameras configured for high stereo depth resolution overlap only partially in the work space. Thus much of the image on the monitor screen will not be presented in stereo. Second, an object located exactly in front of the stereo camera system will be seen to the left of center by the right camera, and to the right of center by the left camera. This may force uncomfortable viewing conditions upon the observer, and may reduce performance drastically. The invention wills solve the second of the above-listed undesirable aspects which result from the use of parallel cameras.

Properly converged camera configurations do not suffer either of the undesirable aspects mentioned above. However, converged camera configurations induce stereo depth distortion. For example, in FIG. 2, with widely converged cameras, 20 and 30 an observer stereoscopically viewing a straight meter stick, located in the fronto-parallel plane (FPP) including the camera convergence point 50, will report that the end sections of the meter stick appear to be curved away from the observer. As the intercamera distance w is decreased, and thus the camera convergence angle is decreased, the apparent curvature of the meter stick diminishes, but with a loss of stereo depth resolution. This problem of distortion/resolution trade-off and solutions for optimizing the stereo depth resolution while minimizing stereo depth distortion is the subject of this invention.

It will be shown herein that distortion changes with intercamera distance, viewing distance, and focal length of the camera lenses. For a fixed viewing distance, widely converged camera configurations yield higher stereo depth resolution. Unfortunately, such a configuration also yields larger stereo depth distortions as will be explained in more detail hereinafter.

Figure 2:
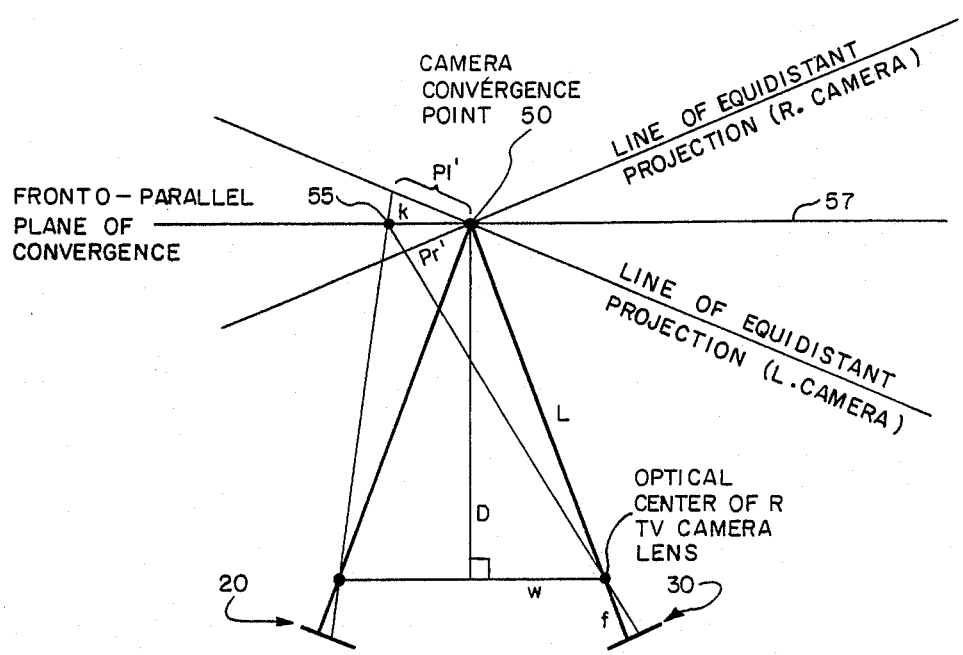
FIG. 2 is a block-diagramatic representation of an understanding of the process of the present invention.

Consider the converged camera configuration in FIG. 2, viewing the same two objects 50,55 both located on a fronto-parallel plane of convergence (FPP) 57. Object 50 is located at the camera convergence point. The left camera 20 will see a greater distance between the two objects than the right camera 30. That is, p1′>Pr′. Therefore, the two cameras will present different distances between the two objects to the monitor. The difference between the distances on the monitor I have called the spatial monitor disparity between the two camera images. The stereo system presents the left camera image to the left eye and the right camera image to the right eye as discussed earlier. If the eyes of an observer see different distances between two objects, the objects 50,55 will be perceived at different depths even though the objects 50,55 are located in the same FPP.

Returning now to FIG. 1, the nature of static stereo depth distortion can be described. By static, I means the distortion that is inherently present on a standard TV monitor screen even when the cameras remain fixed. Such static distortion stems from the camera alignment geometry.

In a quantized TV system, the spatial monitor disparity can be analyzed as the number of pixels difference between the two camera images. The quantized TV system separates space into regions within which motion, as long as confined to a specified and limited region, is invisible. FIG. 1 represents two CCD cameras converged and viewing a work space 40. Each diamond-like shape, which we shall call a lozenge, represents the region in space that is seen by a pair of pixels, one one each camera. If a point source of light is moved within the boundaries which define one lozenge, no location change will be registered by the TV cameras.

Stereo depth resolution is defined by the lozenge size. Specifically, an object which lies in more than one lozenge must move at least half a lozenge length in depth (thus crossing a lozenge boundary) for any depth change to be registered. An analogous situation for lozenge width defines lateral resolution.

The stereo depth distortion of the FPP can be understood as the difference in spatial monitor disparity of the various points on the plane. The camera convergence point, which is on the FPP, has zero spatial monitor disparity. Therefore, the depth distortion of any point on the FPP can be reduced to its spatial monitor disparity which can be understood by the more rigorous mathematical and geometrical analysis that follows.

Most geometric analyses of a stereo camera system, as done by the prior art, uses small angle approximations, which, as previously noted, obscure the relationship between the stereo depth distortion and the key parameters of the camera configuration. Therefore, I have made a more rigorous geometric analysis of resolution/depth distortion without using small angle approximations.

Figure 3:
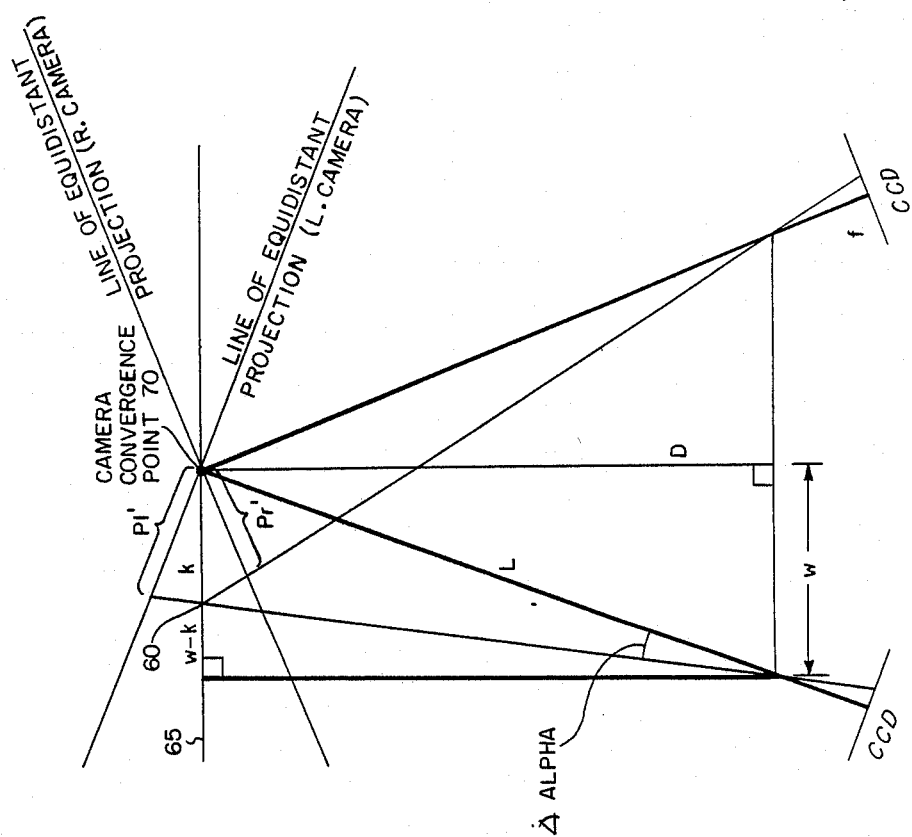
FIG. 3 is a schematic representation of the geometry of a converged camera stereo system.

For my improved derivation, reference is made to FIG. 3 and the data and designations presented therein. By using simple geometric principles applied to FIG. 3, the lines of equidistant projection are drawn for both cameras perpendicular to the viewplate's collection axes. Assume a point 60 located on the fronto-parallel plane 65 of convergence located a distance K horizontally to the left of the camera convergence point 70. Projection of the point 60 on the left camera line of equidistant projection will be P1′ from the camera convergence point 70 where:

$$\begin{aligned} Pl' &= \tan(\text{alpha}) * L \\ &= \tan[\arctan(w/D) - \arctan((w-k)/D)] * L \\ &= \tan\left[\arctan\left(\frac{w/D - (w-k)/D}{1 + w/D * (w-k)/D}\right)\right] * L \\ &= \frac{[w/D + (k-w)/D] * L}{1 - w * (k-w)/D^2} \\ &= \frac{k * L * D}{D^2 + w^2 - k * w} \end{aligned}$$

Similarily, Pr′, the projection on the right camera line of equidistant projection, will be:

$$Pr' = \frac{k * L * D}{D^2 + w^2 + k * w}$$

The difference between the two projections will be:

$$Pl' - Pr' = \frac{2 * k^2 * D * L * w}{(D^2 + w^2 - k * w) * (D^2 + w^2 + k * w)}$$

The number of pixels difference will be:

$$\text{number of pixels diff} = \frac{(Pl' - Pr') * f}{L * (\text{width per pixel at camera plate})}$$

$$= \frac{2 * k^2 * D * f * w}{(D^4 + w^4 + 2 * D^2 * w^2 - k^2 * w^2)} \left( \begin{array}{c} \text{width per pixel at} \\ \text{camera plate (CCD)} \end{array} \right)$$

At this point it should be noted that small angle approximations (x=tan x), for the same criteria would yield:

$$Pl' = Pr' = \frac{k * L}{D}$$

or, equivalently, $Pl' - Pr' = 0$. This comparison reveals that the small angel approximations obscure the nature of the stereo depth distortion of the fronto-parallel plane of convergence.

For the two points on the FPP, one located at the convergence point, and the other a horizontal distance, K, from the convergence point, spatial monitor disparity, expressed as a number of pixels, will be:

$$\frac{\text{number}}{\text{of pixels}} = \frac{2 * k^2 * D * f * w}{(D^4 + w^4 + 2 * D^2 * w^2 - k^2 * w^2) * (WP)} \quad (1)$$

where D=camera viewing distance (from the convergence point to the point equidistant between the first nodal point of the camera lenses)
f=focal length of the lenses (equal for both cameras)
w=ICD/2
WP=the width/pixel at CCD.

For the ranges we are interested in, $k^2 * w^2$ can always be restricted to less than $D^4/1000$, and thus can be ignored.

Formula (1) can be generalized for two points located anywhere in the FPP at arbitrary distances from the camera convergence point. Consider two vertical bars held a fixed distance apart. Let us call the horizontal distance between the camera convergence point and the center point between the two bars ALIGN, and the distance between the bars the inter-target distance (ITD). The values of k in Formula (1) will then be ITD/2+ALIGN and ITD/2−ALIGN. The number of pixels difference we expect is the difference between these squared values which equals 2 * ITD * ALIGN. Therefore, $$\frac{\text{number of pixels}}{\text{difference (2 bars)}} = \frac{2 * D * f * ITD * ALIGN * ICD}{(D^2 + (ICD/2)^2)^2 * (WP)} \quad (2)$$

Here we have replaced w with ICD/2.

By moving the bars horizontally in the FPP, and measuring the observers' perceptions of relative depth between the bars, the appraent shape of the FPP can be determined. For example, if an object in space is located within a lozenge with three pixel difference between camera views, the three pixel difference presented on the monitor will be the stereo depth cue the observer will see. If the object happens to be in the FPP, then the perceived depth associated with the three pixel difference will be purely distortion. In FIG. 1, lozenges A and B have the same number of pixels difference. That is because lozenge A is seen by a pair of pixels which is one pixel to the left (on each camera of the pair of pixels which sees lozenge B.

In fact, all the shaded lozenges in FIG. 1 have the same number of pixels difference. Therefore, objects located within these lozenges will appear in the same plane when viewed on the stereo monitor. This is because all such objects will have the same angular disparity when viewed by the human eyes, and angular disparity is the human stereo depth cue. Equal disparity leads to equal depth, which we interpret as flatness. If this curve in space appears flat when viewed on a stereo TV monitor, the FPP will appear convexly curved away from the viewer.

For the ranges we are interested in , ICD/2 never exceeds D/4 and the denominator will never be larger than $1.2 * D^4$. Thus Formula (2) can be approximated by a $1/D^3$ relation. This will lead to a camera configuration technique which significantly reduces the stereo depth distortion without reducing the stereo depth resolution.

The results of this analysis may be surprising at first. It is well known that when two eyes converge on a point, the points in space that are at equal angles to both eyes lie on a circle. THis circle passes through the convergence point and the first nodal points of the two eyes. This circle is known as the Vieth-Mueller circle. Analogously, a comparable Vieth-Mueller circle can be defined for two converged TV cameras. ("V.M. CIR.") See FIG. 4. The equal angles imply that the number of pixels difference between the left and right images will be zero for all points on the camera's analogous Vieth-Mueller circle.

For a fixed viewing distance D, a smaller ICD yields a Vieth-Mueller circle with smaller radius, that is, sharper curvature.

$$\frac{\text{radius}}{\text{(Vieth-Mueller circle)}} = \frac{D^2 + (ICD/2)^2}{2 * D}$$

Thus, less spatial distortion could be expected for the larger ICD, because a bar need move less distance from the FPP to the location of 0 pixel difference. However, with the larger ICD, Formula (2) predicts a larger number of pixels difference, and thus, a larger stereo depth distortion.

The explanation is as follows:

A larger ICD enhances the stereo monitor disparity, and hence the stereo perception of depth for a given physical separation of two objects in space. Thus the depth difference between the FPP and the Vieth-Mueller circle is enhanced. Calculations for two bars 15 cm apart in the FPP, aligned off-center by 5.5 cm, at a viewing distance D=1.30 meters, and for three typical ICDs are presented in Table 1.

TABLE 1

Pixel characteristics of depth distortion of
converged cameras at three intercamera distances

| ICD | Depth (FPP to V.M. CIR.) | Depth/Pixel diff | # pixels |
|---|---|---|---|
| 16 cm | 1.277 cm | 0.515 cm | <2.5 |
| 38 cm | 1.255 cm | 0.219 cm | >5.7 |
| 60 cm | 1.217 cm | 0.141 cm | >8.6 |

Table 1 shows that by increasing the ICD by a factor of 3.75, (i.e., 60 cm/16 cm), we enhance the depth signal (number of pixel difference) by a factor of more than 3.4, (i.e., 8.6/2.5), even though the actual distance a bar would have to move from the FPP to reach a location of 0 disparity would be smaller.

The detection of a depth difference is a threshold phenomenon. The number of pixels difference must exceed the threshold, or no depth difference will be perceived. For the purposes of this discussion, let us assume a threshold of two pixels difference. Table 1 shows that for the 16 cm ICD, two pixels difference would represent 1.030 cm of depth. For the 60 cm ICD, two pixels would represent only 0.282 cm of depth.

If one bar were located in the FPP and a horizontal distance, k, from the camera convergence point, and a second bar were located at the camera convergence point, then the distance the first bar would have to be moved forward in order to lose the perception that it is behind the second bar is a measure of the depth distortion of the FPP.

For the viewing configuration described by Table 1, and the 16 cm ICD, the first bar need only be moved 0.247 cm, (i.e., 1.030 cm behind the Vieth-Mueller circle) and the observers would not see it as behind the second bar. However, for the 60 cm ICD, the first bar would have to be moved forward 0.953 cm (i.e., 0.282 cm behind the Vieth-Mueller circle,) before the observers would no longer see it behind the second bar. Clearly the 60 cm ICD camera configuration will suffer more distortion then the 16 cm ICD configuration.

The stereo depth resolution for the 60 cm ICD configuration will be higher than for the 16 cm ICD configuration. Thus is because, with the 60 cm ICD, the first bar need be moved a shorter depth distance before the number of pixels difference changes, than with the 16 cm ICD. For example, with the 60 cm ICD, the first bar would be perceived at equal depth with the second bar when it is anywhere between 0.282 cm behind and 0.282 cm in front of the Vieth-Mueller circle. With the 16 cm ICD, the first bar would be perceived at equal depth with the second bar when it is anywhere between 1.030 cm behind and 1.030 cm in front of the Vieth-Mueller circle. Thus when attempting to measure the perceived depth distortions, observers would be expected to be more certain of their perceptions of depth with the 60 cm ICD.

The conclusion here should be stressed. The larger ICDs produce higher depth resolutions, but at the expense of producing greater depth distortions. Thus with larger ICDs, we expect the operator to make larger depth errors (because of the greater distortions), and to be more certain that they are not errors (because of the higher resolution).

Figure 4:
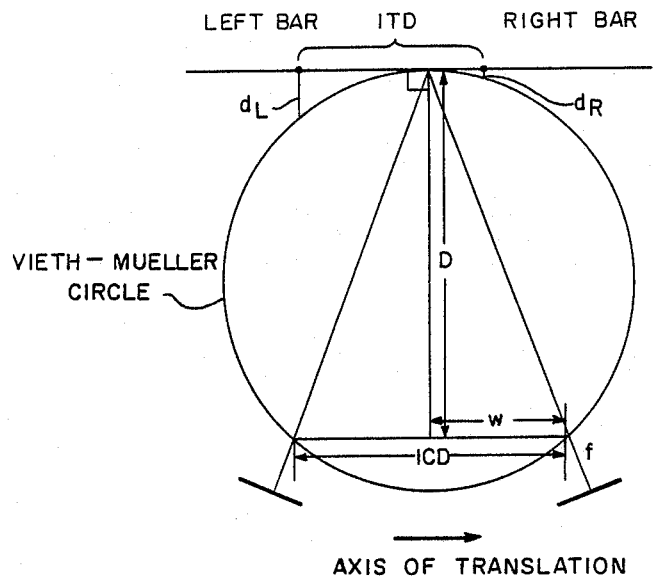
FIG. 4 is a presentation useful in promoting an understanding of depth distortion.
Figure 5:
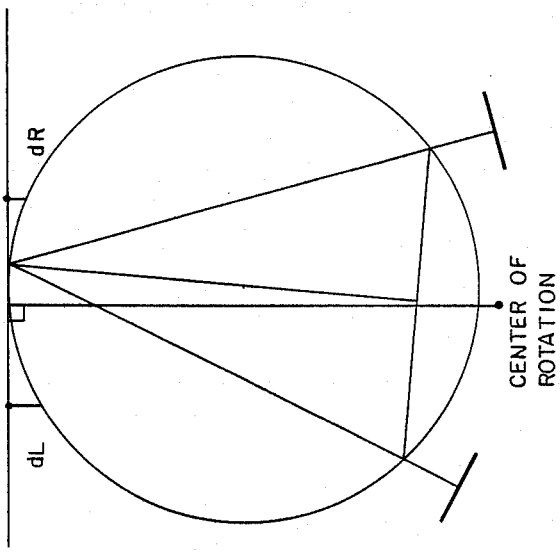
FIG. 5 is a diagram useful in promoting an understanding of minimization of dynamic depth distortion in accordance with the principles of the invention.

In order to inspect the work space horizontally be moving the cameras, one can either translate (as shown in FIG. 4) or pan the cameras (as shown in FIG. 5). Any other horizontal motion can be described as a combination of these two Morion of either type will cause additional distortion, defined as dynamic depth distortion herein. By comparing FIG. 4 with FIG. 5, it can be seen that the depth difference, dL−dR, is smaller than FIG. 5. This is because the rotated Vieth-Mueller circle is closer to the left bar and further from the right bar, than the translated Vieth-Mueller circle. The camera configurations are otherwise identical, and therefore the depth per pixel difference (and stereo depth enhancement) will be the same in both configurations. Panning the cameras produces less depth distortion than horizontally translating the cameras.

All of the above predictions of the geometric analysis were tested with four human observers under controlled laboratory conditions, as is reported in detail in the Diner Report. The nature and results of the details of the experiments confirm the formulas and observations presented above and need not be expressly included in detail in this application. If the Patent Office requires such presentations, I hereby incorporate the results of my experimentation herein through an incorporation by reference to the Diner Report.

The discussion up to this point has not taken into account the actual presentation of the images on the single monitor screen. I discovered that by converging the cameras behind the region of interest (and/or by moving cameras previously converged on a location in the region of interest forward toward the region of interest) an then by shifting the left cameras's image to the left and the right camera's image to the right, the resolution/distortion trade-off problem has been solved.

Another use of field shifting is to align portions of stereo image pairs which may not otherwise be useable stereoscopically. (For example, a camera positioning-/pointing mechanism malfunction might disrupt normal stereo viewing.) Another example, would be to correct for transmission errors of one field or the other and thus obtain useable images.

In order to accomplish the objectives of this invention, all of the options of field shifting is readily provided by apparatus that is well known in the art. Inforamtion representing the odd and even fields. for example, may be stored in any suitable image storage device such as image buffers 44,46 of FIG. 6. A horizontal shift is performed on either or both fields of stored data and is used to independently shift the field information prior to the presentation of the shifted off and even fields to the video screen 48, FIG. 6. The field shifting executes the desired shift option which includes shifting either the odd, even or both fields to the left or to the right, or each field in opposite direction as is required for the task at hand.

Figure 6:
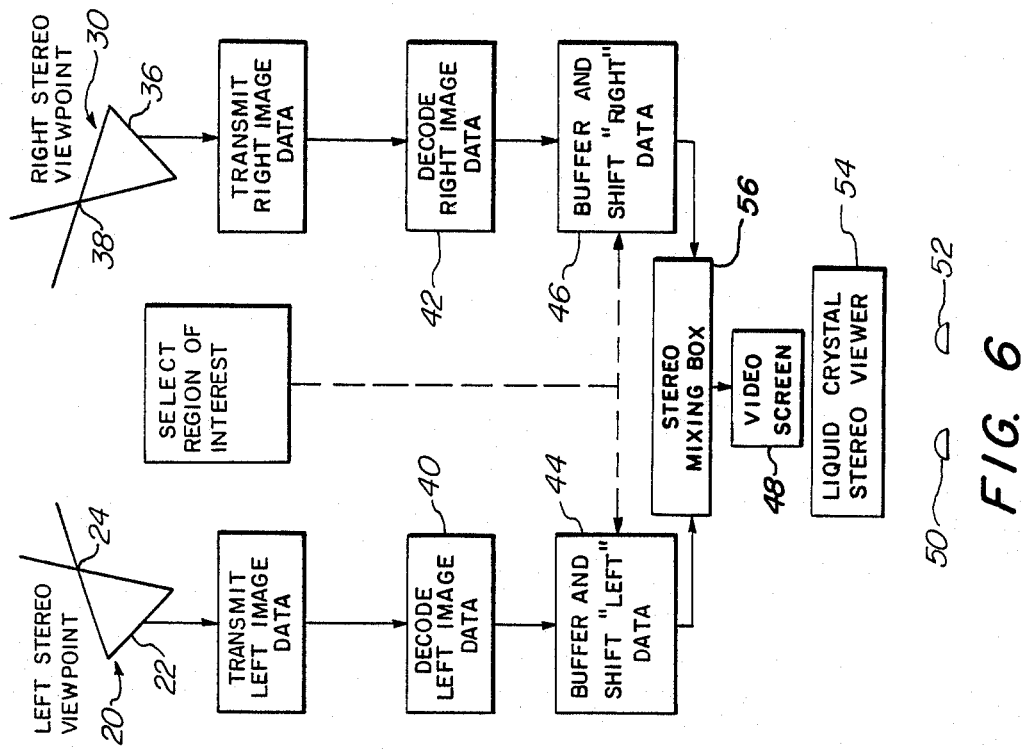
FIG. 6 is a block diagram of apparatus and a method of horizontal field shifting.

FIG. 6 shows one of several ways that the field shifting of this invention may be achieved. The block diagrams of FIG. 6 are illustrative only and should not be taken as limiting the scope and spirit of the invention. In FIG. 6 streams of data representative of the images sensed by the right and left cameras 20 and 30 are transmitted, in accordance with well established practice in the art, to electric decoders 40 and 42. The decoders 40 and 42 send the decoded data to buffers 44 and 46 which are capable of temporarily storing the decoded image data, and are capable of sending the image data to a stereo mixing box (field selector and interlacer) which is capable of sending the image data to a television screen 48 for interlaced display.

The extend of electronic shifting which is required for the optimal stereo viewing area may be pre-programmed into the buffers 44 and 46 for a predefined camera configuration. Alternatively, the extend of shifting may be individually adjusted manually, under computer control and/or in real time for any change in camera configuration. The end result of electronic field shifting is to present an optimal stereo image of the screen for the objects which are in the selected viewing area.

Referring still to FIG. 1, the area defined by the arc DE is within the field of view of both cameras 20 and 30. Within this area, which is closer to the cameras 20 and 30 than the area of arc AC, stereo depth resolution is higher (the diamonds representing the pixels are small). The area defined by the arc DE is also much less curved than the area of arc AC, and with field shifting can be made to appear to lie within the plane of the viewing surface of the monitor when viewed stereoscopically, just like the area of the arc AC without field shifting. Nevertheless, when an almost flat surface appears flat in depth, there is much less depth distortion than when a significantly more curved surface appears flat. Accordingly, in the area DE the depth distortion is relatively small in comparison to the area of AC.

Thus, everything considered, the area of arcuate region to be selected is nearer to curve DE than to curve AC. When closer to DE, an optimal stereo image may be obtained. The left and right cameras 20 and 30 are set up, so that the selected area should substantially coincide with the area DE theoretically available for optimal stereo depth resolution and reduced stereo depth distortion. In other words, in this mode the location of the optimal stereo image is established, and the cameras 20 and 30 are placed so that the desired location should be in the optimal stereo viewing area of the system.

The above-described mode of practicing my invention is highly advanteous in applications where operations or events to be remotely monitored are in a fixed location, and where the cameras can also be conveniently set in fixed locations. As it was noted above, in such a case the extend of electronic shifting of the images to avoid misalignment for the DE surface is fixed by the geometry of the system and by the characteristics of the implementing apparatus.

In another mode of practicing the invention, the location of the cameras, or the location of the selected area for optimal stereo viewing may change while the stereo viewing is in progress. For any particular desired stereo resolution and width of stereo view, one arcuate region such as DE can be chosen as optimal. The cameras will be configured so that the region of interest lies in the cameras' view. When the selected area changes, the extent of electronic shifting, and perhaps camera configuration as well, of the images is adjusted so as to provide good alignment of the images on the screen of the selected viewing area. The adjustment may be done manually or automatically. Adjustment may be accomplished by linking the control of the extend of electronic shifting to some other parameter of the stereo viewing system. For a fixed camera configuration, for example, the distance from a fixed point of a monitored object may be measured, and the extent of electronic shifting of the images on the screen is tied to the measured distance.

Figure 7:
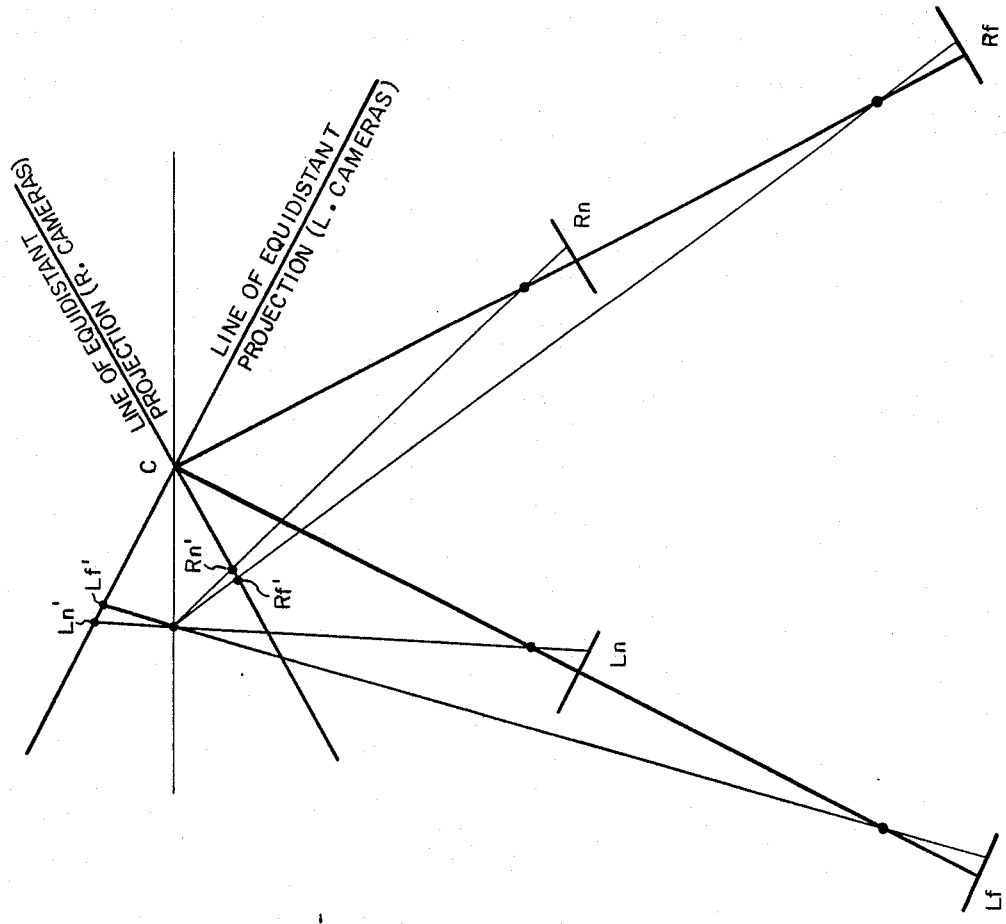
FIG. 7 is a diagram useful in promoting an understanding of minimization of static depth distortion in accordance with the principles of the invention.

A method of minimization of the static depth distortion is presented in conjunction with FIG. 7 and formulas (1) and (2) presented earlier. Consider now the $1/D^3$ relation which resulted from formulas (1) and (2). This leads to a way to greatly minimize static depth distortion without loss of stereo depth resolution. Looking at Formula (2), assume that we view one bar at the convergence point, and a second bar at k=ITD. In this case, Formula (2)=Formula (1), (with the exception of the $k^2 * w^2$ term, which we can ignore) because ALIGN=ITD/2. Now let us ask what would happen if we double the viewing distance D, and double the ICD (which of course doubles w), and also double the focal length. In this case, the cameras would not view the work space from the same angle as before the doubling. We leave k unchanged (which of couse leaves ITD unchanged), and we converge on the same convergence point (which leaves ALIGN unchanged).

Formulas (1) and (2) predict that the number of pixels difference would be halved. That is, the distortion would be halved. Consider now FIG. 7. Here we have the two camera configurations in question. We have labelled the cameras Rn, Rf, Ln, and Lf for Right camera in Near configuration, Rn, Right camera in Far configuration, Rf, etc. We have also drawn two lines parallel to the camera CCD chips which we shall call the lines of equidistant projection. On these lines, every pixel sees a unit length segment of (L/f) * (width/pixel at CCD), where $$L^2 = D^2 + w^2.$$

Because we doubled D, w and f, for cameras Rf and Lf, every pixel on each of the four cameras sees the same size unit length segment for the line of equidistant projection parallel to its CCD chip.

We have labelled the projection points on the corresponding lines of equidistant projection as Rf', Rn', Lf', and Ln'.

Consider first the near cameras. Clearly, the length Ln' to C is larger than Rn' to C. The number of pixels difference will be strictly proportional to (Ln'−Rn'). Consider next the far cameras. Clearly the length Lf' to C will be less than Ln to C. Also, the length Rf' to C will be greater than Rn' to C. Thus, the number of pixels difference, which will be proportional to (Lf'−Rf'), is less than (Ln'−Rn').

We have qualitatively shown that the number of pixels difference for the far cameras will be less than for the near cameras. The quantitative demonstration of this in FIG. 7 precisely follows the mathematical expectations presented by Formulas (1) and (2).

The importance of this point must not be overlooked. By increasing the camera-to-object viewing distance, the ICD, and the focal lengths of the camera zoom lenses, we can maintain image size and stereo depth resolution, while significantly decreasing the static stereo depth distortion.

Figure 8:
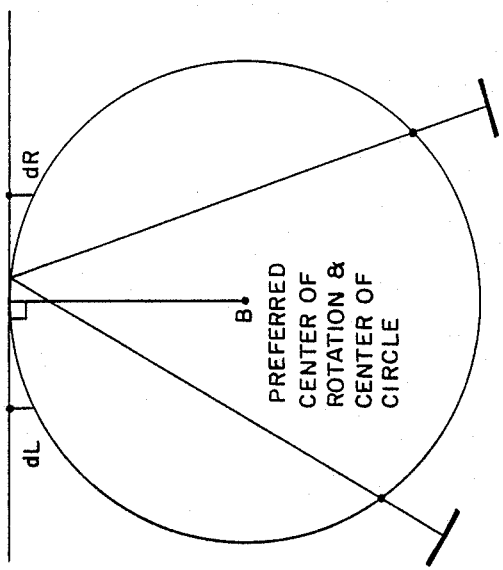
FIG. 8 is a diagram useful in promoting an understanding of the minimization of dynamic depth distortion in accordance with the principles of the invention.

The minimization of dynamic depth distortion will now be discussed with respect to FIG. 8. We have shown that panning about point A in FIG. 5A produces less distortion than translating horizontally (FIG. 4). However, it is easy to see theoretically that panning about point B in FIG. 8 (the center of the V.M. Circle) should produce hardly any distortion at all. If the curves of equal number of pixels difference were a circle with center B, no dynamic distortion at all would be produced. As is, the only dynamic distortion produced would be the difference between circles with center at B and the actual curves. The center of the Vieth-Mueller circle is less than half the distance between the cameras and the convergence point. For close teleoperation, it is easy to compute this point and pan about it as a method of minimizing dynamic depth distortion.

Different tasks and different people may require different depth resolutions and may tolerate different depth distortion. This may well entail on-line adjustments of the camera configuration. The system and method of this invention provides the optimal trade-off between stereo depth resolution and stereo depth distortion for a specific task and operator.

The above description presents the best mode contemplated in carrying out my invention. My invention is, however, susceptible to modifications and alternate constructions from the embodiments shown in the drawings and described above. Consequently, it is not the intention to limit the invention so the particular embodiments disclosed. On the contrary, the invention is intended and shall cover all modifications, sizes and alternate constructions falling within the spirit and scope of the invention, as expressed in the appended claims when read in light of the description and drawings.

What is claimed is:

1. A method of reducing depth distortion of a user's stereo view, of an object present in an image on a standard television monitor while maintaining, essentially constant, the image size and depth resolution, said object being located in a region of interest and viewed by a pair of image-collecting devices, with each device having an image-collecting surface, a focal length, and a central axis from the device's image-collecting surface to the region of interest, said method comprising the improvement of:
    converging the central axes of said image-collecting surfaces behind said object when it is located in said region of interest; and
    simultaneously increasing by equal amounts, the collection-surface-to-object distance, the separation distance between said devices, and the focal lengths for each of the image-collecting devices while holding the convergence of said central axes for both of said devices fixed on the same region of interest as it was prior to said simultaneous increase of said distances and said focal lengths.

2. A method in accordance with claim 1 wherein said step for simultaneously increasing said distances and said focal lengths comprises the further step of:
    moving the image-collecting devices generally laterally with respect to said object so that the distance between the device is changed.

3. A method in accordance with claim 1 wherein the stereo view is obtained by a right and a left image-collecting device and comprising the additional steps of:
    viewing the region of interest from a right side along the central axis of said right image-collection device;
    viewing the region of interest from a left side along the central axis of said left image-collection device;
    obtaining from said image-collecting devices, data representing the views of said images collected by said right and left image-collecting devices; and
    alternately and synchronously projecting the data representing said views collected by said right and said left image-collecting devices on a television monitor so that a user's left eye sees only the data projected on the television monitor from the left imagecollecting device and the user's right eye sees only the data projected on the television monitor from the right image-collecting device.

4. A method in accordance with claim 3 wherein said image on said television monitor is presented by interlacing odd and even horizontal television field sand wherein said projecting step further comprises the additional steps of:
    designating the data representing the view from the left image-collecting device, arbitrarily as either the odd or the even horizontal television field for the television monitor;
    designating the data representing the view from the right image-collecting device as the remaining horizontal television field; and
    interlacing the odd and even fields on the television monitor to form a stereo image for viewing by said user.

5. A method in accordance with claim 4 wherein said television monitor and said stereo view thereon are within the user's limit of binocular fusion and further wherein said projecting step further comprises:
    shifting the data representing the left image to the left for presentation in left-shifted form as one horizontal television field for said television monitor;
    shifting the data representing the right image to the right for presentation in right-shifted form as the other horizontal television field for said television monitor; and
    further wherein said interlacing of said left-shifted and right-shifted horizontal television fields on the television monitor forms a stereo image within the user's limit of binocular fusion.

6. A method of reducing depth distortion and increasing depth resolution of a user's stereo view of an image of an object located in a region of interest as viewed by a stereo television viewing system having overlapping views converged on said region of interest for presenting the views on a monitoring screen, the improvement comprising the steps of:
    converging a central collection axis for each of said overlapped views at a convergence point that is located behind the object which is being viewed and presented on said monitoring screen;
    collecting each of the system's views while said axis for said system are converged on aid convergence point; and
    stereoscopically presenting the collected views on said monitor screen, with said method being further characterized in that said monitor screen and said stereo views presented thereon are within the viewer's limit of binocular fusion and have an optimal depth resolution with minimal depth distortion.

7. A system having a single television screen for presenting a stereo view of an image by use of interlaced odd and even horizontal television field information required to form a stereo image for said screen, the improvement comprising:
    horizontal television field storage means for storing the information which makes up said odd and even horizontal television fields;
    shifting means connected to said storage means for shifting said information representing said odd and even fields stored in said storage means, with said direction of shift being to the left or to the right, or each of said fields being shifted in opposite directions; and
    means for applying said shifted information representing said odd and even fields to said television screen.

8. A system in accordance with claim 7 and further comprising:
   means for obtaining a left and a right image for said stereo image; and
   means connected to said image-obtaining means for converting said left and right images to information which makes up said odd and even television horizontal fields.

9. A system in accordance with claim 8 wherein information from a left and a right image are assigned as said odd an even fields, and further comprising:
   means for collecting said image information; and
   means for supplying said image information from said collection means to said horizontal field storage means.

10. A system in accordance with claim 8 wherein said image collecting means further comprises:
   a pair of television image collection surfaces with each surface having a first nodal point on an image-collection axis for said surface;
   means converging both of the image-collection axes on a convergence point which is located behind an image to be collected: and
   panning means for panning the image collection surfaces about the center of a circle which passes through the convergence point and the first nodal point for each surface.

11. A system in accordance with claim 9 wherein said image collecting means further comprises:
   a pair of image-collection television cameras each having a central axis for collecting a right and a left image for said stereo view; and
   means directing said central axes of said cameras on said convergence point.

12. A system in accordance with claim 11 and further wherein:
   said pair of cameras are located with said central axes being parallel to each other.

13. A system in accordance with claim 11 and further wherein:
   said pair of cameras are located with said central axis for each camera being converged on said convergence point at a distance of about one to five meters from the camera locations.

14. A system in accordance with claim 13 and further comprising:
   a zoom lens having an adjustable focal length for each of said cameras.

15. A system in accordance with claim 14 and further comprising:
   means for adjusting the camera-to-image distance, the camera separation distance and the focal lengths of said zoom lens for each camera, while holding said convergence point for said cameras fixed as it was prior to said adjustment.

16. A system in accordance with claim 15 wherein said increasing means further comprises:
   means for moving each of said cameras by equal amounts generally laterally to change the distance between said cameras.

17. A stereo view image-collecting and image-presenting system having a pair of converged left and right television cameras and a television screen for presenting interlaced odd and even horizontal television fields representing a left and a right image, respectively, that is collected by the pair of cameras, viewing a region of interest said system comprising:
   means for converging an image collecting axis for each of said cameras behind the image to be collected; and
   means for shifting the left camera's image to the left and the right camera's image to the right when presented on said television screen until said screen and said shifted images are both within the viewer's limit of binocular fusion.

18. Apparatus for reducing depth distortion while maintaining essentially constant, the image size and depth resolution of an image on a standard television monitor screen, said image representing an object located in a region of interest as viewed by a pair of image-collecting devices with each device having an image-collecting surface, a focal length, and a central axis to the region of interest from the device's image-collecting surface, said apparatus comprising:
   means for converging the central axes of said image-collecting surfaces behind said object; and
   means for adjusting by equal amounts, the collection-surface-to-object distances for each image-collecting device, the separation distance between said devices, and the focal lengths for each of the image-collecting devices while holding the convergence point of said central axes for both of said devices fixed on the same region of interest as it was prior to said adjustment of said distances and said focal lengths.

19. Apparatus in accordance with claim 18 wherein said means for simultaneously increasing said distances and said focal lengths further comprises:
   means for moving each of the image-collecting devices rearward along said central axes.

20. Apparatus in accordance with claim 18 wherein the stereo view is obtained by a right and a left image-collecting device, and further comprising:
   first means for viewing the region of interest from a right side along the central axis of said right image-collection device;
   second means for viewing the region of interest from a left side along the central axis of said left image-collection device;
   means for obtaining from said image-collecting devices, data representing the views of said images collected by said right and left image-collecting devices; and
   means for alternately and synchronously projecting the data representing said views collected by said right and said left image-collected devices on said television monitor screen so that a user's left eye sees only the data projected on the television monitor screen from the left image-collecting device and the user's right eye sees only the data projected on the television monitor screen from the right image-collecting device.

21. Apparatus in accordance with claim 20 wherein said image on said television monitor screen is presented by interlacing odd and even horizontal television fields and wherein said projecting means further comprises:
   first means for designating the data representing the view from the left image-collecting device, arbitrarily, as either the odd or the even horizontal television field for the television monitor screen;
   second means for designating the data representing the view from the right image-collecting device as the remaining horizontal television field; and means for interlacing the odd and even fields on the television monitor screen to form a stereo image for viewing by said user.

22. Apparatus in accordance with claim 21 and further comprising:
left shifting means for shifting the data representing the left image to the left for presentation in left-shifted form as one horizontal television field for said television monitor screen;
right shifting means for shifting the data representing the right image to the right for presentation in the right-shifted form as the other horizontal television field for said television monitor screen; and further wherein
said interlacing means interlaces said left-shifted and right-shifted horizontal television fields on the television monitor screen to form a stereo image which is within the user's limit of binocular fusion.

23. Apparatus for reducing static depth distortion and increasing depth resolution of a user's stereo view, on a monitoring screen, of an image of an object located in a region of interest as viewed by a stereo television viewing system having overlapping views converged on said object in said region of interest, and comprising:
means for converging a central collection axis for each of said overlapped views at a conversion point that is located behind the object which is being viewed and presented on said monitoring screen;
means for collecting each of the system's views while said axes for said system are converged on said conversion point; and
means for stereoptically presenting the collected views on aid monitor screen; and
with said system being further characterized in that;
said monitor screen and said stereo views presented thereon are within the viewer's limit of binocular fusion and have optimal depth resolution with minimal depth distortion.

24. Apparatus for minimizing dynamic depth distortion while scanning a region of interest with a stereo television viewing system having a conversion point and first nodal points of two view points for the stereo viewing system, when said system is converged on a location in a region of interest defined by overlapping views of said stereo television viewing system, the improvement comprising:
means for aligning said two view points along converged view-collection axes, which intersect at said convergence point in said location of interest; and
means for panning the stereo television viewing system about the center of the circle which passes through the convergence point and the first two nodal points of the two aligned view points of the stereo viewing system.

25. A system having a single television screen for presenting a stereo view of an image by use of interlaced odd and even horizontal television field information required to form a stereo image for said screen, the improvement comprising:
image collection surfaces each having a first nodal point on an image-collection axis;
means converging said image-collection axes on a convergence point behind an image to be collected;
panning means for panning the image collection surfaces about the center of a circle which passes through the convergence point and the first nodal point for each surface;
means for obtaining, from said collection surfaces, a left and a right image for said stereo view;
means connected to said image-obtaining means for converting said left and right images from said collection surface to information which makes up said odd and even horizontal television fields;
horizontal television field storage means for storing said television fields information;
shifting means connected to said storage means for shifting said information representing said odd and even fields stored in said storage means, with said direction of shift being to the left or to the right, or each of said fields being shifted in opposite directions; and
mean for applying said shifted information representing said odd and even fields to said television screen.

26. A system in accordance with claim 25 wherein said system is further defined as comprising:
a pair of television image collection surfaces with each surface having a first nodal point on an image-collection axis for each of said surfaces;
means for converging both of said image-collection axes on said convergence point; and
said panning means pans both of said image-collection surfaces about the center of said circle.

27. A system in accordance with claim 26 wherein said pair of image-collection surfaces further comprises:
a pair of image-collection television cameras, with each camera having a central axis for collecting a right and a left image for said stereo view; ;and
means directing said central axes of said cameras on said convergence point.

28. A system in accordance with claim 27 and further wherein:
said pair of cameras are located with said central exes being parallel to each other.

29. A system in accordance with claim 27 and further wherein:
said pair of cameras are located with said central axis converging on said convergence point at a distance of about one to five meters from the camera locations.

30. A system in accordance with claim 29 and further comprising
a zoom lens having an adjustable focal length for each of said cameras.

31. A system in accordance with claim 30 and further comprising:
means for adjusting the camera-to-image distance, the camera separation distance and the focal lengths of said zoom lenses, while holding said convergence point for said cameras fixed as it was prior to said adjustment.

32. A system in accordance with claim 31 where said adjusting means further comprises:
means for moving each of said cameras generally laterally to each other in order to change the separation distance between said cameras.

* * * * *